United States Patent [19]

Betts et al.

[11] 4,408,189

[45] Oct. 4, 1983

[54] METHOD AND APPARATUS FOR CODE CONVERSION OF BINARY TO MULTILEVEL SIGNALS

[75] Inventors: Malcolm C. Betts, Sherwood Park; Alan F. Graves, Kanata; Frederick M. Pascoe, Nepean; James E. Dilley, Kanata, all of Canada

[73] Assignee: Northern Telecom Limited, Montreal, Canada

[21] Appl. No.: 264,281

[22] Filed: May 18, 1981

[51] Int. Cl.$^3$ .......................................... H03K 13/24
[52] U.S. Cl. .............................. 340/347 DD; 375/17; 375/19; 375/20
[58] Field of Search .................................. 375/18–20, 375/17; 340/347 DD

[56] References Cited

U.S. PATENT DOCUMENTS

| | | | |
|---|---|---|---|
| 3,457,510 | 7/1969 | Lender | 375/60 |
| 3,753,113 | 8/1973 | Maruta et al. | 375/19 |
| 3,754,237 | 8/1973 | de Laage de Meux | 375/19 X |
| 3,760,277 | 9/1973 | Whang | 375/20 |
| 3,828,346 | 8/1974 | Forster et al. | 375/19 X |

Primary Examiner—T. J. Sloyan
Attorney, Agent, or Firm—John E. Mowle

[57] ABSTRACT

A method and apparatus for converting a binary signal to one having quaternary-level symbols with no d-c component. To achieve this, the running digital sum is limited by selectively inverting words within each frame of (n) symbols. A separate (n+1)th symbol is added to each frame to indicate the selective inversion of the words, so that the correct polarity of the (n) symbols can be re-established.

6 Claims, 3 Drawing Figures

METHOD AND APPARATUS FOR CODE CONVERSION OF BINARY TO MULTILEVEL SIGNALS

This invention relates to a digital transmission system and more particularly to a method and apparatus for converting a binary signal to a highly efficient multilevel signal which has no power at zero frequency and twice the Nyquist rate, a small component of power at low frequencies, and a substantial component at the Nyquist rate. These factors facilitate transmission over telephone lines with a-c coupled amplifiers and the recovery of the timing information.

BACKGROUND OF THE INVENTION

In the digital transmission of binary information, the signals are generally converted to multilevel signals prior to transmission. The particular coding of the multilevel signal has a direct bearing on the bandwidth compression, the transmission efficiency, the cost and complexity of the equipment, the error performance and the difficulty of extracting clock or timing information.

For maximum efficiency, the multilevel symbol rate should be inversely proportional to the number of levels of the two signals. Thus, a 100% efficient quaternary code has a symbol rate equal to one-half the binary bit rate. If block mapping codes are used small coding blocks must be used during code conversion to reduce the complexity. In addition, the running digital sum of the transmitted signal should be constrained so that there is no d-c component, otherwise d-c restoration techniques will be required. The low-frequency power of the transmitted signal should also be small in order that small components (particularly small coupling transformers) may be used throughout the system and to minimize the effects of impulse noise. To permit simple clock extraction from the received signal, it is desirable that the spectral energy of the transmitted code be non-zero at the Nyquist rate and zero at twice the Nyquist rate. In addition, the transmitted code must contain sufficient framing and error checking information to function correctly in the transmission system irrespective of the input bit sequence.

In the past various forms of block coding have been used of which the 4B-3T, MS43 and FOMOT Block Ternary Codes are well-known examples. Comparison between these three codes is discussed in a paper entitled "Ternary Line Codes" by J. D. Buchner, Philips Telecommunication Review, Volume 34, No. 2, June 1976, pages 72–86. The MS43 Code is also described in U.S. Pat. No. 3,587,088 entitled "Multi-level Pulse Transmission Systems Employing Codes Having Three or More Alphabets" issued June 22, 1971 to Peter A. Franaszek. In these forms of coding, there is invariably a considerable loss in efficiency due to the use of multiple alphabets with resultant redundancy in order to constrain the running digital sum and hence eliminate the d-c component from the transmitted signal.

A highly efficient scheme is the duobinary system disclosed in U.S. Pat. No. 3,238,299 entitled "High-Speed Data Transmission System" issued Mar. 1, 1966 to Adam Lender. However, one major drawback with this system is that the spectral energy is maximum at d-c, thereby complicating the design of the repeater amplifiers used throughout the system. An alternate approach is described in U.S. Pat. No. 3,457,510 entitled "Modified Duobinary Data Transmission" issued July 22, 1969 to Adam Lender. While this coding scheme eliminates the d-c component, a null in the spectral energy occurs at both the Nyquist rate and twice the Nyquist rate so that complex clock recovery techniques are required.

An entirely different approach is described in U.S. Pat. No. 3,754,237 entitled "Communication System Using Binary to Multi-Level and Multi-Level to Binary Coded Pulse Conversion" issued Aug. 21, 1973 to Patrick de Laage de Meux. In this system, the binary signal is divided into words of n bits to which an (n+1)th bit of constant value is added before coding to a multi-level signal. The (n+1) bit words are then subdivided into partial words, each of which is translated into a multi-level pulse of one or the other polarity in order to constrain the running digital sum of the multilevel signal and hence eliminate the d-c component. Since the (n+1)th bit of each partial word is also inverted, this information can be utilized to correctly reconstruct the original word in the receiver. Also with this scheme, there is spectral energy at the Nyquist rate and none at twice the Nyquist rate thereby facilitating clock recovery. However, to obtain synchronization, an additional synchronization word is transmitted at periodic intervals. This synchronization word reduces the coding efficiency of this coding scheme over that which is obtained by adding only the (n+1)th bit of constant value to each word.

STATEMENT OF THE INVENTION

It has been discovered that an improvement to such a coding scheme can be obtained by adding a separate multilevel symbol to each word or groups of words (which in itself does not include any binary signal information). These additional symbols may be used to reconstruct the correct polarity of the original words, and in conjunction with the words to directly derive the block synchronization and framing information without the inclusion of a separate synchronization or framing word, thereby increasing the overall efficiency of the digital transmission system. In addition one symbol may control the inversion of more than one block if the code has four or more levels.

Thus, in accordance with the present invention a code converter comprises a circuit for converting a binary signal to words of multilevel symbols with one or more words constituting a fame. The converter includes circuitry for substituting inverted symbols for selected words so as to continually reduce the running digital sum of the symbols, and is characterized by additional circuitry for adding a separate multilevel symbol to each frame to indicate the substitution of the inverted symbols in the selected word or words of that frame.

In a particular embodiment termed a mono-block coder, each frame has (n+1) quaternary-level symbols which contains n symbols of converted binary information and a separate (n+1)th quaternary-level symbol which indicates whether inversion has taken place in the n preceding symbols. With this arrangement the binary signal is divided into blocks of 2n binary bits and the converter includes circuitry for converting each block to the n quaternary-level symbols of one of the words. As only two of the four possible states of the separate (n+1)th quaternary-level symbol are required to indicate the selective substitution of the inverted symbols for the words in each frame, the other two states are available to indicate multiframe synchronization of the incoming binary signal.

In another embodiment of this invention, termed the split-block coder, the 2n binary bits are further subdivided into two blocks of n binary bits. The converter includes circuitry for converting each block to n/2 quaternary-level symbols, and each n/2 symbol block is independently and selectively inverted to control the running digital sum. In this embodiment the converter utilizes all four states of the separate (n+1)th quaternary-level symbol to indicate the selective substitution of the inverted symbols for both words in each frame.

The invention also encompasses a method of code conversion comprising converting blocks of binary bits to words of multilevel symbols in which one or more words constitute a frame; thence, inverting selective words to reduce the running digital sum of the symbols; and including a separate multilevel symbol in each frame to indicate the inversion of the selected word or words in that frame.

BRIEF DESCRIPTION OF THE DRAWINGS

Example embodiments of the invention will now be described with reference to the accompanying drawings in which.

DESCRIPTION OF THE PREFERRED EMBODIMENT

The class of code described in the following example of binary to quaternary-level symbol conversion, is of the general form:

2nB/(n+1)Q, where:
n is an integer,
B=number of binary bits/frame, and
Q=number of quaternary symbols/frame.

The selection of n has a direct bearing on such factors as:
Symbol Rate Ratio (SR %) = 100 ($f_Q/f_B$)
Bandwidth Reduction Efficiency (BRE%) = 2 × 100 ($f_B - f_Q$)/$f_B$ where:
$f_Q$ = quaternary symbol rate
$f_B$ = binary bit rate.

It will be evident that for very large values of n, the SR approaches 50% and BRE approaches 100%. However, this is offset by the fact that the limiting value of the running digital sum also increases, thereby increasing the low frequency component of the transmitted signal. The following illustrates the results for n=6 and 8.

| n | 2nB/(n + 1)Q | SR % | BRE % |
|---|---|---|---|
| 6 | 12B/7Q | 58.3 | 83.3 |
| 8 | 16B/9Q | 56.3 | 87.5 |

Such a coding scheme provides a highly efficient yet simple form of transmission utilizing quaternary-level signals.

The limits of the Running Digital Sum (RDS) for quaternary-level symbols in a mono-block frame having relative magnitudes and polarities of +3, +1, −1 and −3 are:
Maximum RDS (end of mono-block frame) = 3(n+1)
Maximum RDS (instantaneous, n even) = 3(n+1+n/2)
Maximum RDS (instantaneous, n odd) = 3(n+1+(n+1)/2)
In a split-block frame, the RDS has limits of:
Maximum RDS (end of word or frame) = (3n/2+3)
Maximum RDS (instantaneous, n/2 even) = (9n/4+3)
Maximum RDS (instantaneous, n/2 odd) = (9n/4+1.5)
Thus:

| | RDS (mono-block) | | RDS (split-block) | |
|---|---|---|---|---|
| n | End of Frame | Instantaneous | End of Word/Frame | Instantaneous |
| 6 | 21 | 31 | 12 | 16 |
| 8 | 27 | 40 | 15 | 21 |

Figure 1:
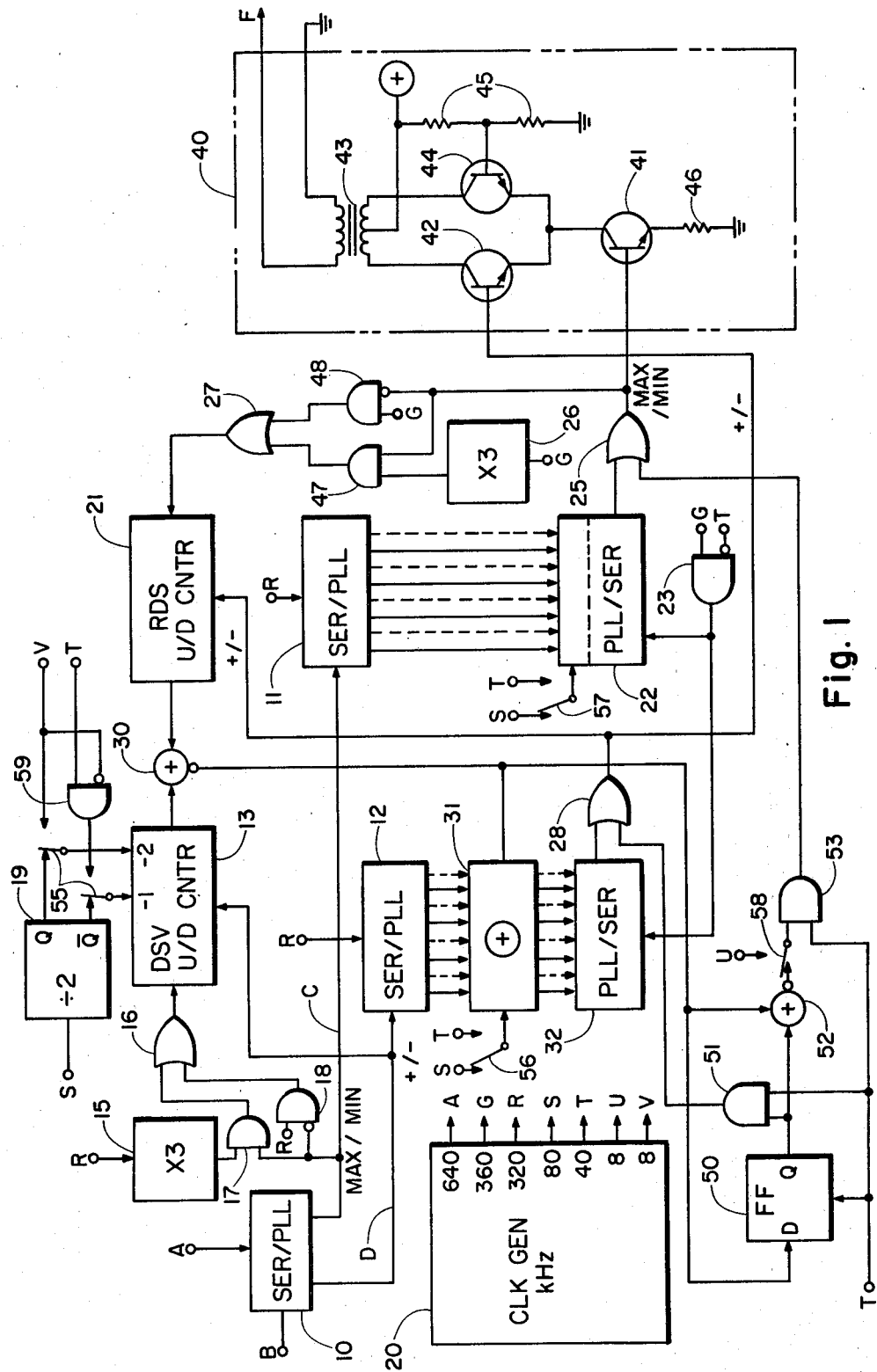
FIG. 1 is a block and schematic diagram of a circuit which will function as either a mono or split-block code converter for encoding binary signals into signals having multilevel symbols.
Figure 2:
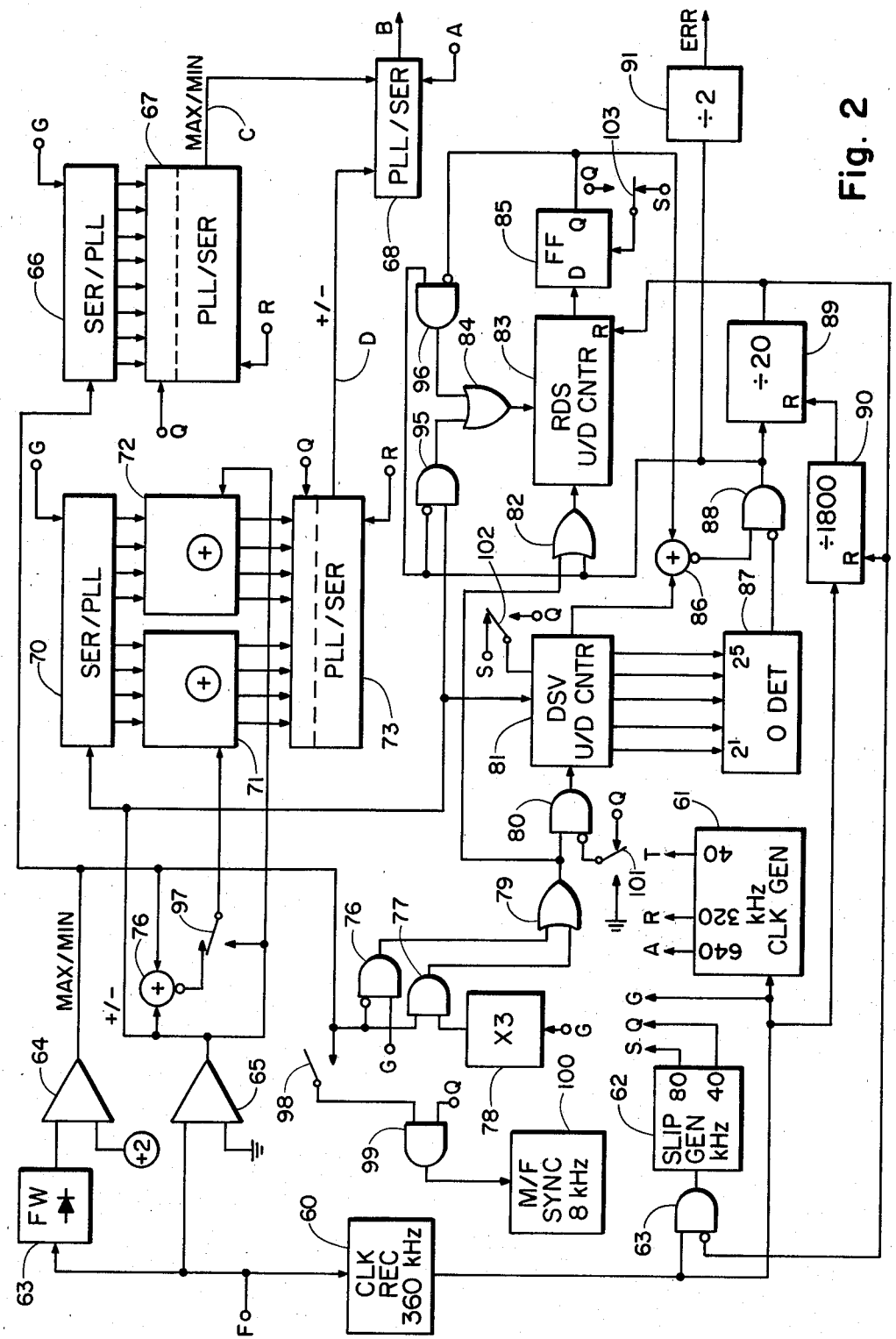
FIG. 2 is a block and schematic circuit diagram of a circuit which will function as either a mono or split-block converter for decoding the signals having multilevel symbols back to binary signals.
Figure 3:
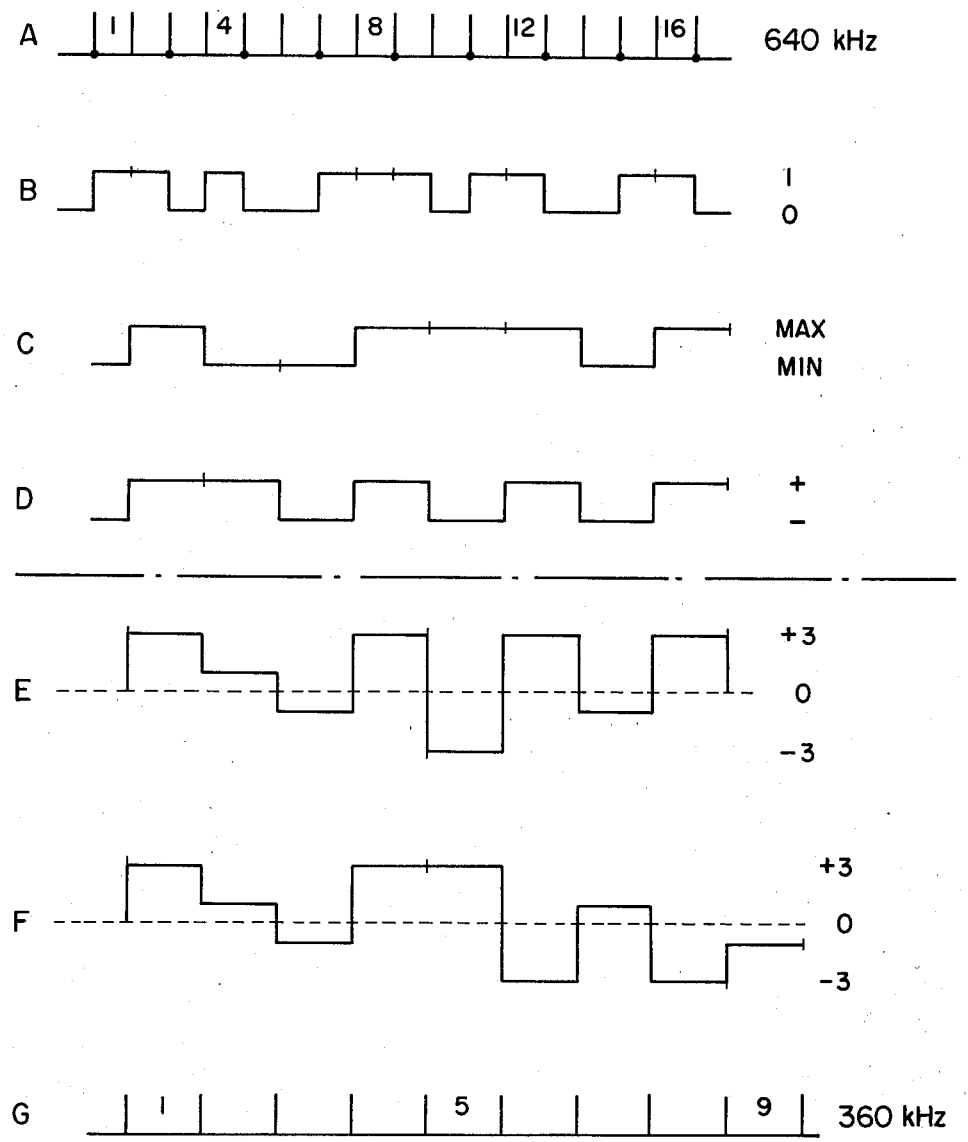
FIG. 3 illustrates typical waveforms in the split-block code converter of FIGS. 1 and 2.

In this example embodiment of a split-block coder, the location of the waveforms of FIG. 3 are identified by corresponding reference characters in FIG. 1 and 2. In order to more clearly illustrate the relationship between the various waveforms, the time frame of waveforms A, B, C and D has been slightly foreshortened relative to that of waveforms E, F and G so that the signals are vertically aligned. In real time, the period for the 16 intervals of waveform A would be equal to that of the 9 intervals of waveform G.

Also in this embodiment a value of n=8 has been selected. Referring to FIG. 3, each frame has 9 quaternary-level symbols F comprising two words each of 4 symbols, plus an added 9th symbol to indicate the selective inversion of the two words. A binary signal B of 2n=16 bits is converted to the two four-symbol words. Thus FIG. 3 illustrates typical waveforms for one frame of the input signal.

It will be evident that each frame need not necessarily be separated into two sequential words but that the symbols may be allocated to each of the words in any predetermined sequence. This will tend to reduce the low frequency component of the spectral density for certain repetitive coding sequences.

Referring to FIGS. 1 and 3, a 640 kb/s binary input signal B is connected to the input of a two-stage serial-to-parallel converter 10 which is driven by a clock signal A from a generator 20. In the code converter each pair of binary bits of the input signal B is converted to one quaternary-level symbol F. At the parallel output of the converter 10, the first binary bit C of each pair represents the magnitude (max/min) of the symbol while the second bit D identifies its polarity (+/−). Bits C and D are loaded into serial-to-parallel converters 11 and 12 respectively under control of a 320 kHz clock signal R from the generator 20.

The digital sum variation (DSV) of each word is determined by an up/down counter 13. This variation is obtained by counting input pulses the number of which are controlled by the binary magnitude bits C. A maximum magnitude bit opens AND gate 17 to couple 3 pulses from the X3 multiplier 15 through an OR gate 16 to the input of the DSV counter 13. Conversely, a minimum magnitude bit connected to the inverted input of the AND gate 18, will result in a single pulse R being coupled through the OR gate 16 to the input of the counter 13. Concurrently, the binary bit of the signal D representing either a positive or negative polarity, at a second input to the counter 13 causes the counter to count up or down respectively. The counter 13 is initialized to a value of −2 at the beginning of each frame and a value of −1 at the beginning of the second word of that frame by the outputs of the divide by two counter 19 driven by an 80 kHz clock signal S, to compensate for the digital sum variation introduced by the additional 9th symbol which is added to each frame to identify the inversion of selected words therein.

Referring again to FIG. 3, odd numbered binary bits of the input signal B which represent the magnitude of the quaternary-level symbol, are transformed to the magnitude signal C delayed by one bit. The even numbered bits of the input signal B are transformed to the polarity signal D. Without selective inversion, these two signals could be readily utilized to produce a quaternary-level signal having balanced signal levels of +3, +1, −1 and −3 as shown in waveform E. However, this would invariably result in a large low-frequency component in the spectral energy of the transmitted signal. This can be avoided by selectively inverting the words to continually minimize the running digital sum (RDS) of the transmitted signal. This RDS is determined by an up/down counter 21 which functions in a manner similar to that of the counter 13.

The four magnitude bits C from the converter 11 are loaded in parallel into the parallel-to-serial converter 22 under control of an 80 kHz clock signal S. The output from the converter 22 is driven by a 360 kHz clock signal G through an AND gate 23 which is interrupted every 9th pulse by the 40 kHz clock pulse T in order to insert the additional symbol. Tshe magnitude bits are coupled through an OR gate 25 and are used to control one input of the RDS counter 21 through a X3 multiplier 26, AND gates 47, 48, driven by the 360 kHz signal G, and an OR gate 27 in a manner identical to that of the magnitude input to the DSV counter 13. The output of the OR gate 25 is also used to drive the magnitude input of a symbol generator 40. Concurrently, a polarity bit at the second input to the counter 21 is used to determine whether the counter counts up or down. However, unlike the DSV counter 13, the RDS counter 21 is not reset at the beginning of each word.

At the beginning of each frame the DSV counter 13 is initialized to a value of −2. Utilizing the example signal of waveform E, at the end of the first four quaternary-level symbols, the digital sum variation stored in the counter 13 has a value of +6 −2= +4. Assuming the RDS currently stored in the counter 21 has a value of −1, the polarity outputs from the counters 13 and 21 will be logical 1 and 0 respectively. This will produce a logical 0 at the inverted output of the modulo-2 adder 30. This logical 0 is fed to the modulo-2 adders 31 which results in no polarity inversion of the four polarity signals from the output of the converter 12. These four non-inverted polarity signals under control of the 80 kHz clock signal S, are connected to the parallel-to-serial converter 32, the output of which is coupled to the OR gate 28 under control of the 360 kHz clock signal G from the AND gate 23. It will be evident that with binary notation, a positive or negative value must be assigned to the polarity signals at the outputs of the counters 13 and 21 whenever the DSV or RDS is zero. In this embodiment, a stored count of zero results in a positive polarity signal at the respective outputs.

The magnitude and polarity signals from the first word are being loaded into the RDS counter 21 at approximately the same time that the second word is being loaded into the DSV counter 13 which has now been initialized to −1 at the beginning of this word. As can be seen from waveform E, the second word results in a digital sum variation in the counter 13 of +1 when it is initialized to a value of −1. Once the first word is loaded into the counter 21, the running digital sum will have changed from −1 to +3. With both polarity outputs from the counters 13 and 21 indicating a positive polarity of the digital sum variation and the running digital sum, a logical 1 is now coupled from the adder 30 to the modulo-2 adder 31 which causes the four polarity bits of the second word to be inverted. These polarity bits from the two words are coupled from the output of the converter 32 through the OR gate 28 to the polarity input of the RDS counter 21. Concurrently they are coupled to the polarity input of the symbol generator 40, at the same time the magnitude bits from the OR gate 25 are connected to the magnitude input.

The magnitude signal sets the controlling voltage on a voltage controlled current source comprised of a transistor 41 and resistor 46. A maximum magnitude signal causes a high level current to be provided to the differential switch comprising transistors 42 and 44. A minimum magnitude signal results in a low level current. A bias network 45 is set so that when the polarity signal is positive, transistor 42 is turned hard on and transistor 44 off, thereby causing an output of a positive polarity across the transformer 43. Conversely, when the polarity signal is negative, transistor 42 is cut off and transistor 44 is turned hard on thereby causing an output of negative polarity from the transformer 43. This results in an output signal F as shown in FIG. 3. Thus, the polarity of this output signal F is determined by the signal from the output of the OR gate 28, whereas its magnitude is determined by the signal from the OR gate 25.

In this example, the first word of the frame was transmitted non-inverted while the second word has transmitted inverted (note the inversion of the second half of waveform F relative to that of waveform E). The selective inversion of the two words is indicated by a separate (n+1)th or 9th symbol which is added at the end of each frame. The count in the DSV counter 13 is weighted by the initializing signals to compensate for the polarity and magnitude of this 9th symbol so that this symbol will not introduce a d-c component of its own. The relative magnitude and polarity of this separate symbol is:

| 1st Word | 2nd Word | Separate Symbol Magnitude/Polarity |
| --- | --- | --- |
| inverted | inverted | +3 |
| inverted | non-inverted | +1 |
| non-inverted | inverted | −1 |
| non-inverted | non-inverted | −3 |

The polarity of this 9th symbol pulse is obtained by storing the output at the end of the first word from the modulo-2 adder 30 in a D-type flip flop 50. At the end of each frame, the 40 kHz frame pulse T is used to trigger an AND gate 51 which couples the output of the flip flop 50 to the OR gate 28 and thence to the generator 40. Concurrently, the parallel-to-serial converter 32 is inhibited by the frame pulse T which is connected to the inverted input of the AND gate 23.

The magnitude of the 9th symbol is obtained by adding the output at the end of the second word from the modulo-2 adder 30 to that from the first word in a modulo-2 adder 52, the inverted output of which is connected to an AND gate 53 the timing of which is controlled by the framing pulse T. The output of the AND gate 53 is coupled through the OR gate 25 to the magnitude input of the generator 40. Again, the output of the parallel-to-serial converter 22 is inhibited during this 9th symbol by the framing pulse T. With the first word being transmitted non-inverted and the second word inverted, a logical 0 is obtained at the output of the modulo-2 adder 52. From the table, a non-inverted first word and an inverted second word results in the 9th symbol having a value of $-1$ as shown in waveform F.

In the split-block code converter, each frame is encoded from two 8 bit binary words. In order to function as a mono-block code converter, switches 55, 56, 57 and 58 are moved to their alternate positions, and each frame is encoded from one 16 bit binary word into 8 quaternary-level symbols. The dotted lines between converters 12, 31 and 32, and 11 and 22 now indicate the parallel transfer of two groups of 8 bits. Now only two of the four possible states of the separate symbol are required to indicate the selective inversion of the single word. As shown, only the polarity of the separate symbol is utilized to achieve this. Thus a 9th symbol of value $-1$ indicates no inversion of the previously transmitted 8 symbols. With this arrangement the magnitude of the separate symbol can be used to establish multiframe synchronization of the incoming binary signal since it is redundant to the transmission scheme. If m frames form one multiframe (e.g. m=5), multiframe synchronization may be detected by altering the amplitude of every (m)th separate quaternary-level symbol. Thus, with switch 58 connected to 8 kHz clock U, only every fifth separate symbol will be of maximum amplitude while the intervening ones will be of minimum amplitude. This scheme requires that there be an integer relationship between the multiframe structure of the incoming scheme and the frame structure of the transmission code. This is not a requirement of the transmission scheme itself.

In order to compensate for the DSV of the 9th separate symbol, the DSV counter 13 is initialized to a value of $-1$ at the beginning of each frame in which a minimum magnitude separate symbol is to be transmitted and to a value of $-3$ (shown as $-2$ in FIG. 1) when a maximum magnitude separate symbol is to be transmitted. The 40 kHz signal T and the 8 kHz signal V (which leads the 8 kHz signal U by one frame) are used to initialize the counter 13 either directly or through an AND gate 59.

Referring now to the converter for decoding the quaternary-level symbols illustrated in FIG. 2, it can be seen that the same reference characters identify the corresponding signals used in the encoding converter of FIG. 1. In the decoding converter, the quaternary-level signal F at the input is fed to a clock recovery circuit 60 which generates the 360 kHz clock signal G squaring and filtering the incoming signal F in a well known manner. This in turn is used to drive a clock generator 61 which in turn generates clock signals A, R, and T. In addition to the 40 kHz clock signal T, the clock signal G is used to drive a slip generator 62 through an AND gate 63 to produce a 40 kHz clock signal Q as well as the 80 kHz clock signal S.

The relative magnitude of each symbol of the signal F is obtained by first rectifying the signal in a fullwave rectifier 63 to obtain a positive output signal which is fed to a comparator 64 having a $+2$ volt reference. The output of the comparator 64 is a binary signal representative of the magnitude (max/min) of each symbol of the input signal F. The polarity ($+/-$) of each symbol of the signal F is readily obtained by feeding the signal to a comparator 65 which has as its reference, ground.

The magnitude signal from the comparator 64 is fed to a serial-to-parallel converter 66 which is under control of the 360 kHz signal G. Once the magnitude signals of both words of each frame are loaded into the converter 66 they are transferred in parallel to a parallel-to-serial converter 67 under control of the 40 kHz clock signal Q. The eight magnitude bits C of the two words are then outputted under control of the 320 kHz clock signal R to a second parallel-to-serial converter 68.

In a similar manner, the polarity signals of the two words of each frame from the comparator 65 are connected to the input of a serial-to-parallel converter 70 also under control of the clock signal G. These eight polarity bits are coupled to modulo-2 adders 71 and 72 in order to restore the correct polarity of signals which are selectively inverted in order to reduce the running digital sum prior to transmission. The eight bits from the modulo-2 adders 71 and 72 loaded under control of the 40 kHz clock signal Q, into a parallel-to-serial converter 73 which is driven by the 320 kHz clock signal R to produce the corrected polarity output signal D that is fed to the second input of the parallel-to-serial converter 68. This converter 68 which is driven by the 640 kHz clock signal A produces the recovered binary signal B at its output. The timing of these clock signals is such that the separate 9th symbol of each frame is not loaded into the converters 67 or 73.

The correct polarity of the polarity signal for the two words of each frame is restored in the modulo-2 adders 71 and 72. It will be evident from the description of the code converter of FIG. 1, that the polarity of the 9th symbol of each frame determines the polarity of the first word in the modulo-2 adder 72. Hence, the recovered polarity bit of the 9th symbol from the comparator 65 is coupled directly to the modulo-2 adder 72. A positive polarity bit indicates that the first word was inverted while a negative polarity bit indicates that it was non-inverted. The modulo-2 addition of the magnitude bits with a positive bit in the adder 72 will reinvert the signal to restore its original polarity.

The polarity of the second word is restored by connecting both the magnitude and the polarity bits from the comparators 64 and 65 to a modulo-2 adder 76, the inverted output of which is coupled to the input of the modulo-2 adders 71. This control signal is such that the polarity bits of the second word will be re-inverted whenever the 9th symbol has a relative magnitude of $+3$ or $-1$ and will remain non-inverted when the magnitude of the 9th symbol is $+1$ or $-3$.

The correct recovery of the binary signal B is predicated upon frame synchronization of the 40 kHz clock signal Q. Correct frame synchronization can be determined by comparing the polarity of the digital sum variation (DSV) of the current word against that of the running digital sum (RDS) prior to that word. A signal which is in correct frame synchronization will have a DSV with the opposite polarity to the RDS so as to continually minimize the running digital sum. To determine this, the magnitude signals are used to control the clock signals G which are fed to a DSV up/down counter 81 either directly or via a X3 multiplier 78, AND gates 76 and 77, an OR gate 79 and an AND gate 80 in a manner similar to that of the counter 13. As in the encoder, the DSV counter 81 counts up or down 3 for maximum amplitude pulses and up or down 1 for minimum amplitude pulses. Concurrently, the binary bit of the polarity signal representing either a (+/−) polarity is fed to a second input of the counter 81 to cause the counter to count up or down respectively. After each word is counted, the counter 81 is reset by the 80 kHz clock signal S. The AND gate 80 is inhibited during the presence of the 9th bit representing the magnitude of the separate symbol by the 40 kHz clock signal Q which is fed to an inverted input of the gate 80.

Concurrently, magnitude pulses from the OR gate 79 are coupled through an OR gate 82 to the input of an RDS up/down counter 83. Simultaneously, the polarity bits from the comparator 65 are coupled through an AND gate 95 and an OR gate 84 to the counter 83. At the end of the first word of each frame and at the end of each frame, the polarity of the RDS is stored in a flip-flop 85. This polarity, which represents the total RDS up to, but not including the current word, is compared against that of the DSV of the current word. If the signal is in correct frame synchronization, the DSV will always be of the opposite polarity to the RDS except when the DSV is zero. This exception occurs because a zero DSV is originally encoded as a positive signal since either one polarity or the other must be selected in the encoder and inversion of the symbols of a zero value word by the encoder will not change its polarity. To ensure that this ambiguity does not result in a polarity violation, the latter is negated by coupling the binary output of the counter 81 to a zero detector 87, the output of which disables an AND gate 88 whenever a zero DSV is detected.

It is obvious that, on initialization of the system, the instantaneous value of the RDS of the incoming signal is unknown. Hence it is necessary for the RDS counter 83 to automatically search for the correct value of the RDS, and this is achieved within the framing mechanism.

When the polarity of the RDS and the DSV are the same, (there is a high probability of this occurring when the two signals are out of frame synchronization), a logical 1 is connected from the inverted output of the modulo-2 adder 86 to the second input of the AND gate 88 and then through the OR gate 82 to the input of the RDS counter 83. Concurrently, the output of the flip-flop 85 is fed through the inverted input of an AND gate 96 to the second input of the OR gate 84 whilst the normal polarity signal is blocked by AND gate 95. The two signals from the AND gates 88 and 96 coupled through the OR gates 82 and 84, cause the RDS to move towards zero by a count of 1. Thus, the RDS counter 83 is continually being adjusted towards this zero point whenever the output from the DSV counter 81 is of the same polarity as that of the RDS counter 83. Concurrently, a count of 1 is stored in a divide-by-twenty counter 89. If the decoder is out of synchronization, this will continue to occur until a count of 20 is reached at which time an output from the divide-by-twenty counter 89 is fed to the inverted input of the AND gate 63 which inhibits the input to the slip generator 62 for 1 symbol. This causes the incoming signal to slip by one symbol at the inputs to the parallel-to-serial converters 67 and 73. Concurrently, the output from the divide-by-twenty counter 89 resets both the RDS counter 83 and a divide-by-1800 counter 90 to 0. This procedure continues until frame synchronization is re-established.

At this instant in time the RDS counter 83 will be set at zero and could be the maximum for an eight bit (four symbol) word of 15 adrift from the true RDS value. Each additional polarity violation detected will cause the RDS counter 83 to be adjusted by 1 in a direction that will converge it towards its true value. Hence after a maximum of 15 violations from the point when synchronization is established, frame synchronization will be correct, and the true instantaneous RDS will be present in the RDS counter 83. Once these conditions are reached the RDS counter 83 and the DSV counter 81 will always be of opposite polarity, and the inverted output from the modulo-2 counter 86 will be a logical 0.

In the mono-block coder described above in which one 16 bit binary word is encoded as 8 quaternary-level symbols, the polarity of the separate 9th symbol is used to indicate the selective inversion of the words while its magnitude is used to provide multiframe synchronization information for the decoded binary signal. To achieve the latter in the mono-block decoder, switches 97, 98, 101, 102 and 103 are moved to their alternate positions. Both modulo-2 adders 71 and 72 will now be controlled by the polarity signal from the output of the comparator 65. In addition a maximum amplitude separate symbol is used to gate AND gate 99 together with the 40 kHz clock signal Q to determine the 8 kHz multiframe synchronization at the detector 100.

To establish frame synchronization of the incoming signal, the entire 9 symbols of each frame are fed to the DSV counter 81. To implement this, AND gate 80 is effectively disabled by connecting its inverting input to ground. The reset and control inputs to counter 81 and flip-flop 85 are connected to 40 kHz clock Q. Although not shown, as such, the zero detector 87 can be disabled as a zero condition cannot occur for an odd number of symbols. With the mono-block codes, the maximum end-of-frame RDS is 27 (as opposed to 15 for the split-block codes). This necessitates changing the divide-by-20 counter 89 to a divide-by-32 counter, and the divide-by 1800 counter 90 to a divide-by 3000 counter.

An alternate arrangement for establishing frame synchronization is to provide well known circuitry which detects the predetermined sequence for the absolute magnitude of the ninth symbol S9. For m=5, |S9|=3,1,1,1,1,3,1,1--.

Noise on the transmission path may cause the input symbols to be incorrectly decoded, the result of which is that the instantaneous value of the RDS held in the RDS counter will be in error. This will lead to polarity violations between the RDS and DSV counters 83 and 81 being detected by the modulo-2 adder 86 even though the signal is in correct frame synchronization. These detected signals may be used to indicate line errors by coupling the AND gate 88 through a divideby-two counter 91 to an error output. The purpose of the divide-by-two counter 91 is to provide a correct reading of the number of errors since each single error to an adjacent symbol state will produce two error signals at the output of the AND gate 88.

If these error signals were allowed to accumulate in the divide-by-twenty counter 89, it would eventually produce an output signal which would in turn inhibit the input to the slip generator 62 thereby causing the incoming signals to go out of frame synchronization. To avoid this condition, the recovered clock signal G is coupled to the input of the divide-by-1800 counter 90 which transmits a reset pulse to the divide-by-twenty counter 89 every 200 frames of the quaternary-level output signal F. This reset signal from the counter 90 does not normally affect the divide-by-twenty counter 89 when the converter is out of frame synchronization since the error signals from the exclusive OR gate 86 occur at such a high rate that the divide-by-1800 counter 90 is reset sufficiently often by the divide-by-twenty counter 89 that the former never generates a reset signal at its output. In normal operation, the symbol error rate of the incoming quaternary-level signal F is less than 1 in $10^7$. However, under test conditions, symbol error rates in excess of 1 in $10^3$ are insufficient to cause the decoder to lose frame synchronization. Thus, there is a wide margin of safety for random error signals before frame synchronization is lost.

What is claimed is:

1. A code converter comprising:
   means for converting blocks of binary bits into words of multilevel symbols, the words being grouped into frames;
   a running digital sum counter for determining the running digital sum of all previously converted multilevel symbol words;
   a digital sum variation counter for determining the digital sum variation of each word;
   means responsive to the counters for inverting selected words so as to minimize the accumulated running digital sum of the previously converted multilevel symbol words, and the selected words; characterized by:
   means for including a separate multilevel symbol at the end of each frame to indicate the inversion of said selected words; and
   means for initializing the digital sum variation counter at the beginning of each word to a value which compensates for the digital sum variation of the separate multilevel symbol, whereby the polarity of the digital sum variation of the current word may be compared against that of the preceding running digital sum to reestablish frme synchronization.

2. A code converter as defined in claim 1 in which each frame has (n+1) quaternary-level symbols; and in which the converter includes:
   means for dividing each frame into first and second words each having n/2 quaternary-level symbols, and into the additional (n+1)th quaternary-level symbol;
   means for converting a block of n binary bits into the n/2 quaternary-level symbols of one word;
   means for utilizing all four states of the separate (n+1)th quaternary-level symbol to indicate the selective inversion of both words in each frame.

3. A code converter as defined in claim 1 in which each frame has (n+1) quaternary-level symbols in which m frames form one multiframe of the binary signal; and in which the converter includes:
   means for dividing the binary signal into blocks of 2n binary bits;
   means for converting each block to n quaternary-level symbols; and
   means for altering one of the polarity and magnitude parameters of each separate (n+1)th quaternary-level symbol to indicate the selective substitution of inverted symbols for the word in each frame, and for altering the other parameter to identify every (m)th frame, whereby multiframe synchronization can be restored.

4. A code converter as defined in claim 2 in which the binary signal is further divided into pairs of binary bits, one bit of each pair determining the magnitude of one of the symbols and the other bit determining the polarity of that symbol;
   means responsive to each maximum or minimum magnitude bit to cause the stored count to change by 3 or 1 respectively, and responsive to each positive or negative polarity bit to determine the direction of that change; and
   means for determining the polarity of the stored count at the end of each of the two words in the digital sum variation counter against the polarity of the previously stored count in the running digital sum counter and for generating the polarity and magnitude of the additional multilevel symbol therefrom.

5. A code converter for decoding a signal having quaternary-level symbols of the type from the converter defined in claim 2, comprising:
   means for converting the quaternary-level symbols of the two words of each frame to binary signals; and
   means for establishing frame synchronization for the words characterized by:
   a digital sum variation counter for storing a count at the end of ech word representative of the relative magnitude and polarity of ech of the symbols, and a running digital sum counter for storing a count representative of the relative magnitude and polarity of each of the symbols prior to that word;
   means responsive to a like polarity of the count stored in each of the counters to reduce the absolute count in the running digital sum counter and thereby converge the latter count to its correct value; and
   means responsive to a selected number of like polarities of the counts stored in each of the counters for shifting the phase of the converting means by a sub-multiple of each frame, so as to reestablish from synchronization.

6. A code converter as defined in claim 4 in which:
   the relative magnitude of the balanced quarternary-level symbols is +3, +1, −1 and −3;
   said digital sum variation counter is initialized to a value of −2 at the beginning of the first word and a value of −1 at the beginning of the second word; and
   the relative magnitude of the additional (n+1)th quaternary-level symbol for the non-inverted and inverted words is:

| 1st Word | 2nd Word | Additional Symbol Magnitude |
|---|---|---|
| inverted | inverted | +3 |
| inverted | non-inverted | +1 |
| non-inverted | inverted | −1 |
| non-inverted | non-inverted | −3 |

* * * * *